(No Model.)
C. C. WORTHINGTON.
VALVE GEAR FOR PUMPS.
No. 526,429.
5 Sheets—Sheet 3.
Patented Sept. 25, 1894.
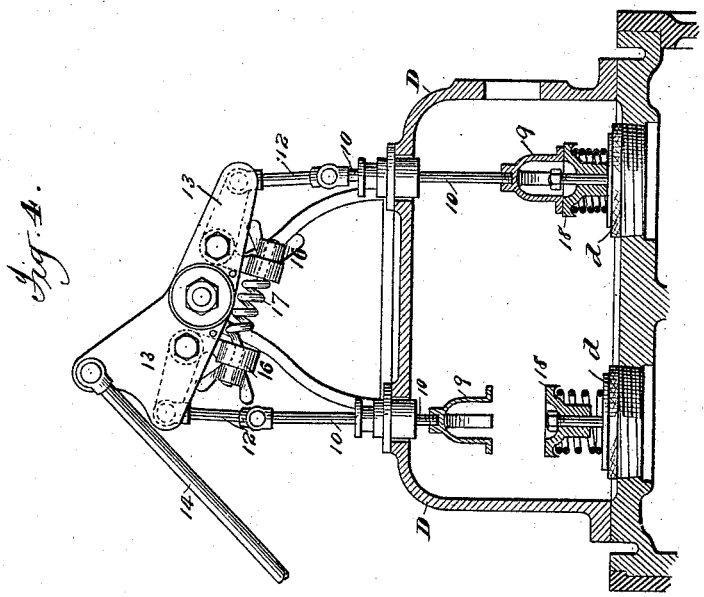
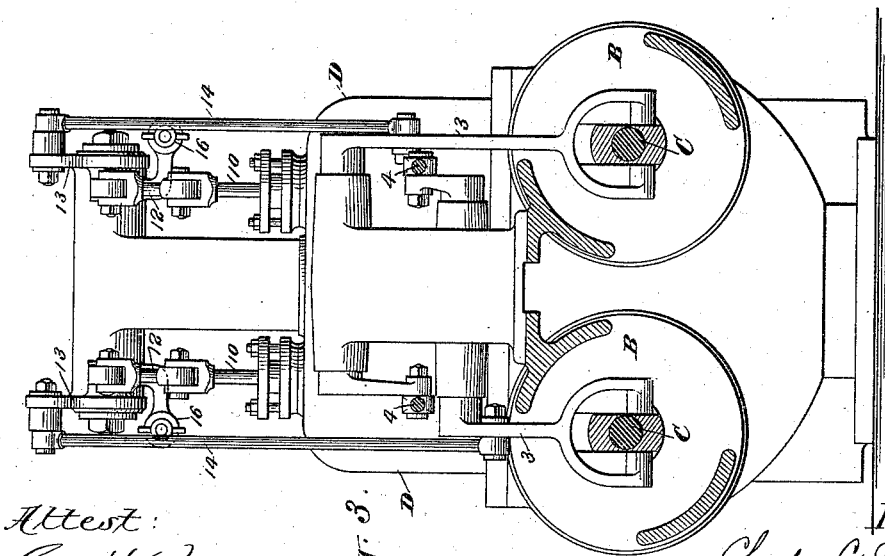

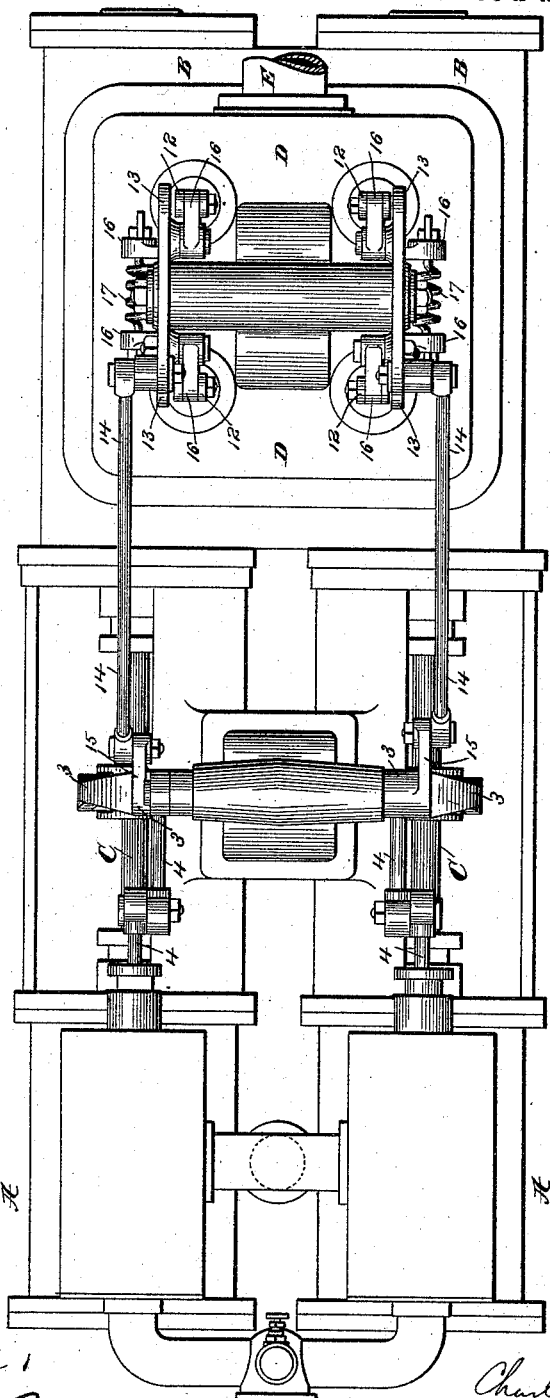

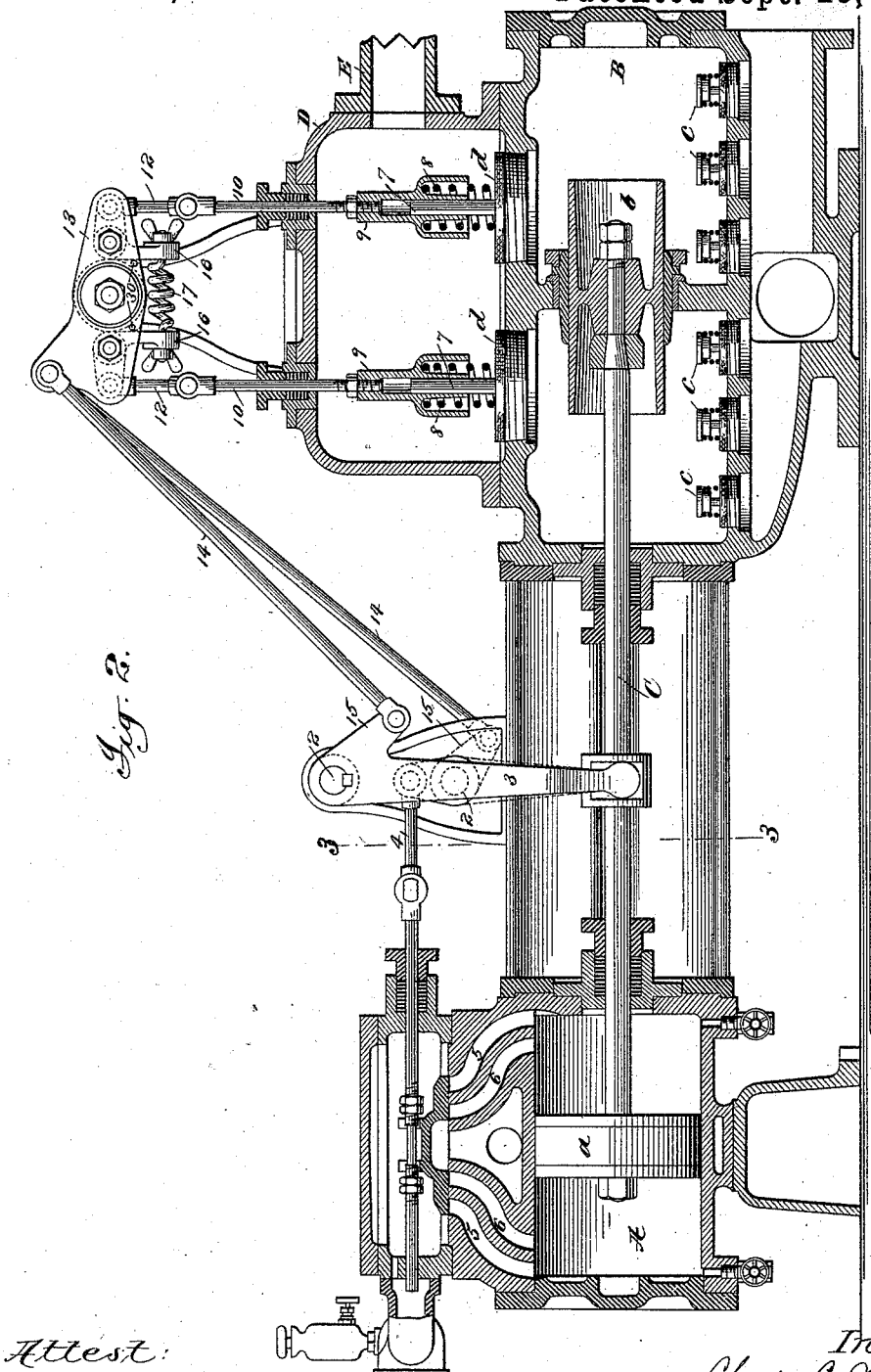
(No Model.) 5 Sheets—Sheet 2.
C. C. WORTHINGTON.
VALVE GEAR FOR PUMPS.
No. 526,429. Patented Sept. 25, 1894.

(No Model.)
C. C. WORTHINGTON.
VALVE GEAR FOR PUMPS.
No. 526,429. Patented Sept. 25, 1894.
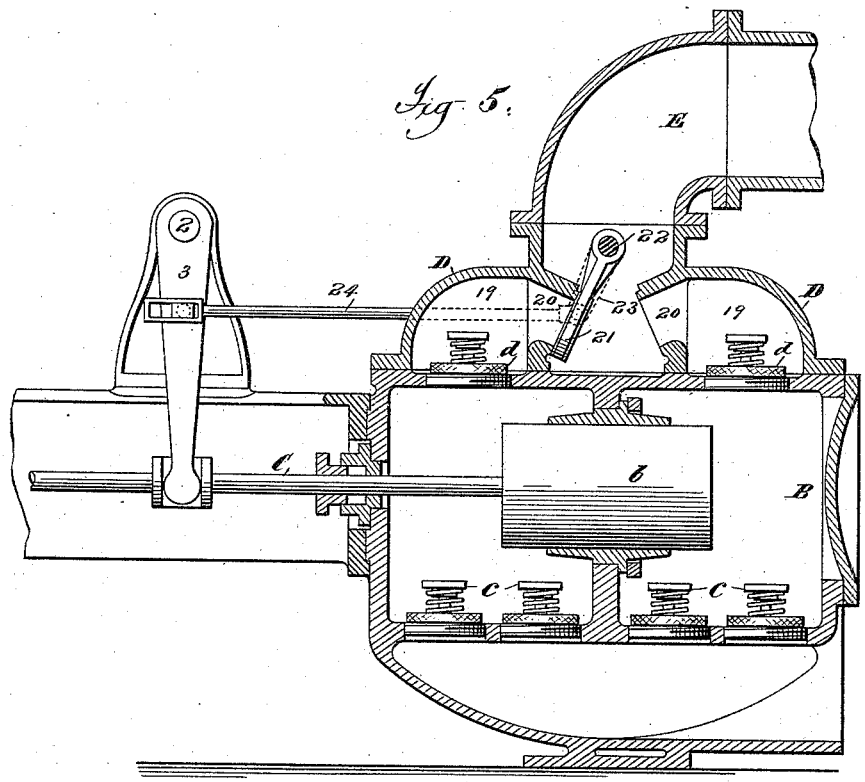
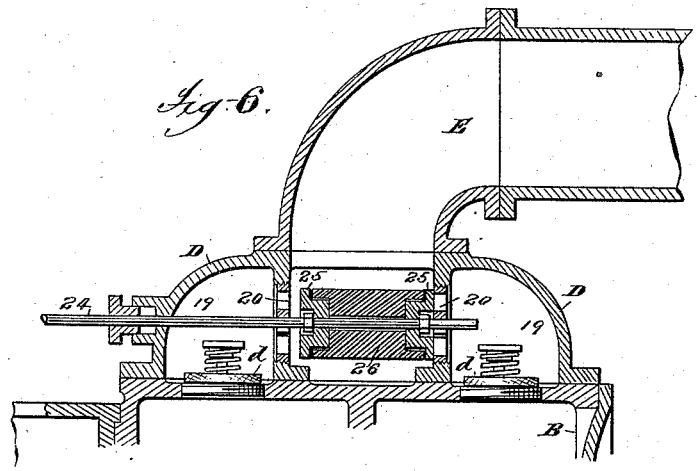

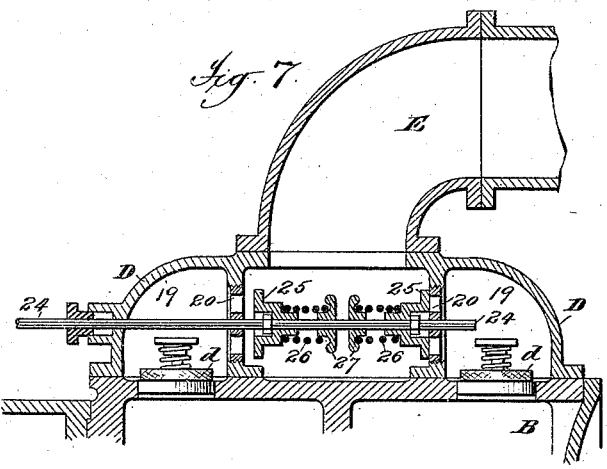
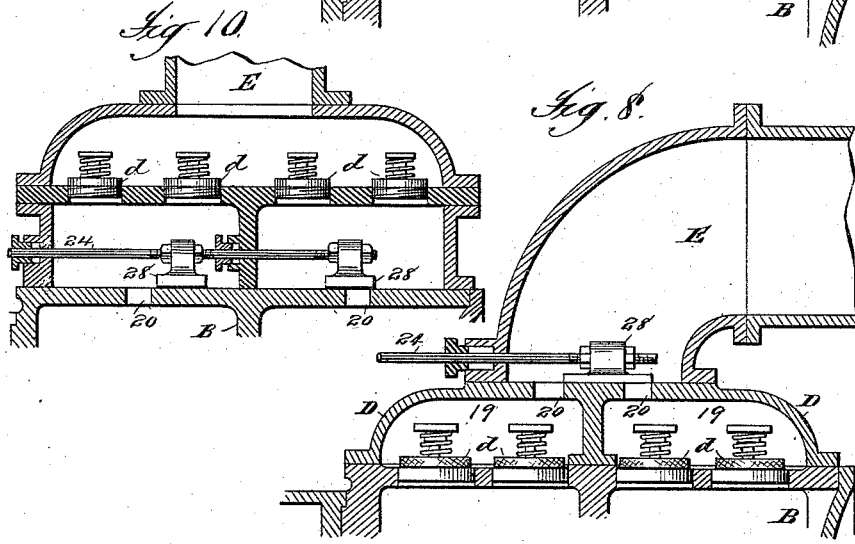
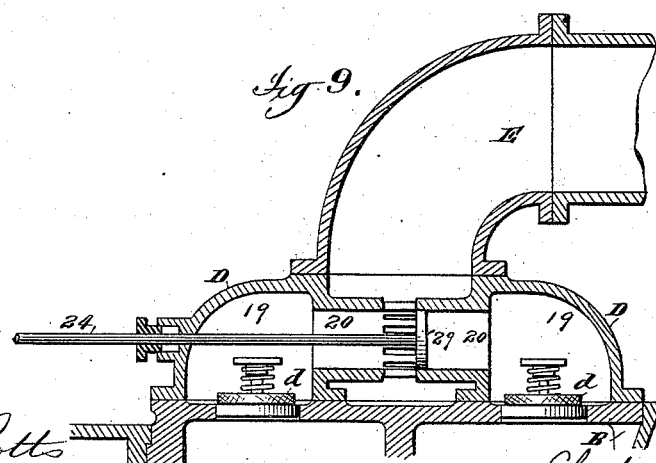

UNITED STATES PATENT OFFICE.

CHARLES C. WORTHINGTON, OF IRVINGTON, NEW YORK.

VALVE-GEAR FOR PUMPS.

SPECIFICATION forming part of Letters Patent No. 526,429, dated September 25, 1894.

Application filed March 28, 1890. Serial No. 345,733. (No model.)

*To all whom it may concern:*

Be it known that I, CHARLES C. WORTHINGTON, a citizen of the United States, residing at Irvington, county of Westchester, and State of New York, have invented certain new and useful Improvements in Valve-Gear for Pumps, fully described and represented in the following specification and the accompanying drawings, forming a part of the same.

This invention relates to improvements in pumping engines, it being the object of the invention to increase the speed at which such engines can be operated successfully.

While certain features of the invention are of general application in pumping engines, the invention is of special application to that class of engines known as direct acting pumping engines, and more especially to duplex direct acting pumping engines in which certain features of the invention co-operate with other features of the construction to secure certain special results not attained in other pumps.

In direct acting engines, as is well known, the steam piston or pistons is or are attached directly to the rod which carries the pump plunger without the intervention of a crank, and as a consequence the piston and plunger are free to move in either direction, according to the side of the piston upon which the pressure is greater. As a result of this arrangement of the steam piston and pump plunger, it has been customary to provide the engines of this class with some means by which the piston and plunger were arrested just at the end of the stroke in each direction, so as to be prevented from coming into more or less violent contact with the heads of the cylinder to the damage of the engine. A variety of devices have been proposed for this purpose, but that most generally adopted in practice has consisted of double steam ports located in the same cylinder or cylinders, so that the exhaust would be closed by the piston just before it reached the end of its stroke, thus causing the piston to cushion upon a small portion of the exhaust steam remaining in the cylinder and be arrested gently. This method has been found satisfactory, at the speeds at which this form of engine is usually run. Wherever this speed is increased, however, the momentum of the moving parts becomes sufficient to compress the steam thus imprisoned between the exhaust port and the cylinder head to a pressure which causes a rebound or recoil of the moving parts of the engine. This recoil is due to this pressure in the cushion acting upon the piston plus the pressure in the force main acting upon the plunger. This pressure in the force main is communicated to the plunger through the force valves, which at that moment of the stroke have not had time to close. The effect of this recoil is to permit the water in the force-chamber to flow rapidly through the force valves into the pump cylinder, producing a current which slams the force valves violently to their seats. The violence of this slam increases as the speed of the engine is increased and soon becomes an element of danger.

The object of this invention is to provide means whereby, when the engine arrives at the end of the stroke, this recoil is prevented, and the plunger enabled to remain without movement, until it begins its return stroke. In the time elapsing between the forward stroke and this return one, the valves have sufficient time to seat themselves noiselessly, if this recoil does not take place. To accomplish this a valve or valves are so located on the pump and so acted upon by the action of the machine as to close the valve or valves positively and cut off the pressure in the force main from the plunger of the pump, exactly at the end of the stroke and thus prevent it from driving the plunger back with the recoil above described. The result above stated can be accomplished by a variety of connections and by a valve or valves arranged in a variety of ways. Several arrangements suitable for the purpose and each embodying the present invention are shown in the accompanying drawings, in which—

Figure 1 is a plan view of a duplex direct-acting pumping engine embodying the present invention in one of its forms. Fig. 2 is a longitudinal sectional elevation of the same. Fig. 3 is a cross-section taken on the line 3 of Fig. 1, looking toward the water cylinders. Figs. 4 to 10 are sectional views illustrating different forms of the invention, which will be hereinafter referred to.

Referring to said drawings it is to be understood that the pump or pumping engine therein illustrated is as to its general construction of the ordinary duplex form. It consists of two steam cylinders A, and two water cylinders B. The pistons *a* and the water plungers *b* for each side of the engine are connected to a common rod C in the ordinary manner. It is of course to be understood that the water cylinders may be provided with pistons instead of plungers, but plungers are usually employed and that term will be used herein, and it is to be understood that in a broad sense it includes pistons as equivalent devices.

The steam cylinders are provided with the usual valve gear, consisting of rock-shafts 2, levers 3 and connecting rods 4, by which the steam valve for each side of the engine is operated from the piston-rod of the other in the manner common in duplex engines. The steam cylinders are provided with separate induction and exhaust ports 5, 6, so that, as the pistons *a* near the end of their strokes in either direction, they cover the exhaust ports 6 and confine a small amount of exhaust steam in front of them in the ends of the cylinders, by which they are cushioned and arrested. Any other form of apparatus may, however, be used for this purpose. The water cylinders are provided with the usual suction-valves *c* and force-valves *d*, there being, however, in the organization shown in Figs. 1 to 4 but two force-valves for each water cylinder—one for each end of the plunger.

Referring now particularly to Figs. 1 to 4 the embodiment of the invention therein shown will be described.

The force valves *d* for each water cylinder are located in the usual force-chamber D and are arranged to rise and fall on spindles 7, they being provided with springs 8 which tend to press the valves toward their seats. The upper ends of the springs 8 enter sockets in vertically-moving heads 9 which are recessed to receive the spindles 7 by which they are guided, and are connected to rods 10 which pass upward through the stuffing-boxes in the top of the force-chamber. The two rods for each side of the engine are connected by links 12 to the opposite ends of an oscillating lever 13 which is fulcrumed upon a frame rising from the top of the force chamber and is connected by a rod 14 with an arm 15 extending from the shaft 2. The links 12 might be connected directly to the rocking levers 13 but as sometimes an obstruction might lodge under one of the valves, which would prevent it from being closed and cause breakage if the connection were direct, it is preferable to provide a yielding connection between the valves and the levers 13, so that, in case of an accident of the character just stated, there will be sufficient yield between the valve and its lever to prevent damage. One suitable form of connection for this purpose is shown, in which the links 12 are connected to one arm of bell-crank levers 16 which are fulcrumed upon the levers 13. The opposite ends of the pair of levers 16 for each side of the engine are connected by a stout spring 17, which normally holds the levers 16 in the position shown in Fig. 1, the arms of the levers to which the spring is connected being prevented from coming any nearer to each other by reason of stops 30 projecting from the levers 13 against which they abut. The strength of the spring 17 is sufficient to maintain the levers 16 against their stops.

The operation of the mechanism which has been described is as follows: It is to be remarked that, as shown in the drawings, the engine is at rest and both sides of the duplex engine are on center. This is not a position that the two sides of the engine will assume at the same time when in actual operation, but it has been adopted for facility in illustration. In describing the operation it will be assumed that the piston *a*, as shown in Fig. 2, is started from left to right. As the piston moves to the right the water in front of the plunger *b* will be forced past the valve *d* of that end of the cylinder, raising the valve against the tension of the spring 8 in the usual manner and at the same time water will be drawn in behind the plunger *b*, raising the suction valves of that end of the cylinder. As the piston *a* and plunger *b* approach the end of their stroke the piston *a* will cover the exhaust port 6 and cushion itself upon the steam confined in the end of the steam cylinder and the piston *a* and plunger *b* will be arrested.

It will readily be seen that, if no special means is provided for closing the valves except the springs, the force valve *d* would be open at the time the plunger is stopped, so that the full pressure of the water in the force main and force chamber would be permitted to react for a short period of time upon the plunger. If the speed of the engine is such that the momentum of the moving parts compresses the steam held between the piston and cylinder head sufficiently, the back pressure of the steam cushion, together with the pressure of the force main upon the plunger causes a rebound or recoil of the piston and plunger, thus reducing a rapid current from the force main through the force valves into the water cylinder, which slams the force valves violently to their seats, as above described. This recoil of the plunger slams also the suction valves *c*, which have not had time to close. In the present organization, however, as the plunger proceeds to the right as before described, the lever 13 through the connections which have been described is rocked so as to gradually force downward into the force chamber the rod 10 and head 9 above the spring 8 of the valve, past which the water is being forced, and this continues, the spring being gradually compressed, until just as the plunger arrives at the end of its stroke and is arrested, when the rod 10 and head 9 arrive in position to force the valve *d* positively to its seat, thereby closing the valve without shock and cutting off the pressure which exists in the force main and the force chamber from in front of the plunger so that no reaction, and, consequently no recoil can take place, thus permitting the suction valve to close gently.

Upon the return stroke, the same operation takes place at the other end of the water cylinder. If, by any accident an obstruction should lodge under the valve $d$ so as to prevent it from being forced to its seat, the spring 17 will, as before explained, yield sufficiently to prevent damage. The connections through which this valve or valves is or are operated may be varied widely as to form without departing from the invention, and the valve selected for positively cutting off this pressure from in front of the plunger at the proper time may be the force valve as ordinarily employed, or it may be a special auxiliary valve located anywhere in the force chamber, of the water cylinder or in its force main between the water cylinder and the usual air chamber employed upon the force main.

Several different forms of valves suitable for the purpose, and connections for operating them, are illustrated respectively in Figs. 4 to 10 and will now be briefly referred to.

The organization shown in Fig. 4 is substantially the same as that already described, except that the heads 9 are made in two parts, 9 and 18, so as to allow an amount of lost motion between the rod 10 and the spring of the valve. The operation is exactly the same as before described.

In Figs. 5 to 9 organizations are shown in which an auxiliary valve is used for cutting off the pressure from in front of the plunger at the end of the stroke. In these cases the force valves $d$ remain the same as in the construction first described, but the force chamber of each water cylinder is divided into two compartments 19, one for each end of the plunger and these compartments communicate by ports 20 with the force main E.

In the construction shown in Fig. 5, the ports 20 for each side of the engine are controlled by a swinging valve 21, which is supported upon a rock-shaft 22 passing onward through the side of the main and are provided with a rock-arm 23, which is connected by a rod 24 with one of the levers 3. The rod 24 is connected with the lever 3 by means of a stud which passes through a slot in the rod so as to provide a certain amount of lost motion between the lever and the rod, whereby the valve 21 is not moved to shut off the pressure from in front of the plunger until just at the end of the stroke. The operation of this organization is substantially the same as of those already described. As the plunger moves from right to left, for example, and arrives at the end of its stroke, the valve 21 will be shifted to the position shown in Fig. 5 so as to close the port 20 leading to that end of the cylinder and shut off the pressure in the main from in front of the plunger, and upon the return stroke the operation will be reversed.

The organization shown in Fig. 6 is substantially the same as that shown in Fig. 5 except that two valves are employed to control the ports 20, and these valves are arranged upon a rod corresponding to the rod 24 which, however, passes into the force chamber. In this case the two valves 25 are spring-seated by a spring formed of a block of rubber or other suitable material 26 interposed between them.

The organization shown in Fig. 7 is exactly the same as that shown in Fig. 6 except that the rod 24 is provided with two collars 27, and independent springs 26 for the two valves 25 are substituted for the rubber block.

In the organization shown in Fig. 8 the two ports 20 are controlled by a slide valve 28, which is attached to the rod 24 and is operated by the rod, the same as in the previous organizations, to close the port leading to the water cylinder in front of the plunger and to open the other port, as the plunger arrives at the end of its stroke.

The organization shown in Fig. 9 is the same as that shown in Fig. 8, except that a piston valve 29 is employed, instead of a slide valve, to control the two ports 20. The operation of the piston valve 29 will readily be understood by reference to the drawings.

While it is more desirable for simplicity of construction to place the auxiliary valves shutting off the reaction of the water column upon the plunger beyond the force valves, that is, between the force valves and air chamber, as shown in Figs. 5 to 9, they may be located between the plunger and the force valves without interfering with their operation as already described. This arrangement is shown in Fig. 10, in which the construction and operation are the same as in Fig. 8, except that the sliding valve is placed inside the force valves, the ports 20 opening into the water cylinder, and two valves are required, as the rod 24 passes through the partition separating the force chambers.

By the use of an auxiliary valve placed between the plunger of the direct-acting pump and the air chamber, either between the plunger and the force valve or between the force valves and air chamber, I do not in any respect alter the functions of the force valves. In case the auxiliary valve becomes obstructed at any time and held from its seat by some foreign matter passing through the pump, the force valves are still free to act and prevent the pressure of the main from entering the water cylinder during the suction stroke, which would place both sides of the plunger in equilibrium to the great danger and probable breaking of the engine. Arranged as here shown, the only result would be a noisy action of the engine until the auxiliary valve has been relieved from the obstacles under its seat by the current of water passing through it, or the engine has been shut down and the obstacle taken out by those in charge of the engine. Further, in case of any accident or breakage, either to the auxiliary valve or its connecting mechanism, the valve may be removed until such a time as it can be repaired, during which interval the engine may be operated as an ordinary pump at a somewhat slower piston speed than is customary with the auxiliary valve in commission.

In the organizations shown in Figs. 5 to 10 inclusive, it is of course apparent that the valves $d$ may be entirely omitted, though it is preferable to retain them.

In all of the organizations which have been described, it will be observed that the valve which operates to cut off the pressure from in front of the plunger at the end of the stroke is operated positively to do this, although in some cases there is a yielding connection which permits the pressure which is applied to close the valve to be applied gradually, increasing as the plunger nears the end of its stroke, or from the beginning or near the beginning to the end of the stroke. This yielding connection also serves to prevent damage in case obstruction is offered to the movement of the valve. The valve may open automatically as in the construction shown in Figs. 1 to 4, or it may be operated positively in both directions, as shown in Figs. 5 to 10.

What I claim is—

1. The combination with the plunger of a direct acting steam pump, of a valve located upon the force side of the plunger, and means substantially as described for positively closing the valve to remove the pressure of the force main from in front of the plunger as it reaches the end of its stroke, substantially as described.

2. The combination with the plunger of a direct acting steam pump, of a valve located upon the force side of the plunger, a spring against which the valve opens by the pressure of the water, and means substantially as described for positively compressing said spring against the valve to close it and remove the pressure of the force main from in front of the plunger as it reaches the end of its stroke, substantially as described.

3. The combination with the plunger of a direct acting steam pump, of a valve located upon the force side of the plunger, and connections substantially as described between said valve and a moving part of the pump for positively closing the valve to remove the pressure of the force main from in front of the plunger as it reaches the end of its stroke, substantially as described.

4. The combination with the plunger of a direct acting steam pump, of a valve located upon the force side of the plunger, and connections substantially as described between said valve and a moving part of the pump for positively closing the valve with a yielding pressure to remove the pressure of the force main from in front of the plunger as it reaches the end of its stroke, substantially as described.

5. The combination with the plunger of a pump, of a valve located upon the force side of the plunger, a spring against which the valve opens by the pressure of the water, a rocking lever connected to a moving part of the pump, and a rod also connected to said lever and arranged to compress said spring against the valve to close it and remove the pressure of the force main from in front of the plunger as it reaches the end of its stroke, substantially as described.

6. The combination with the plunger and force valves of a pump, of an auxiliary valve located between the plunger and force main, and means substantially as described for closing the valve to prevent backward circulation of the water from the force main through the force valves, as the plunger reaches the end of its stroke, substantially as described.

7. The combination with the plunger and force valves of a pump, of an auxiliary valve located between the plunger and force main, and connections between said valve and a moving part of the pump for closing the valve to prevent backward circulation of the water from the force main through the force valves, as the plunger reaches the end of its stroke, substantially as described.

8. The combination with the plunger and force valves of a pump, of an auxiliary valve located between the force valves and force main, and connections between said valve and a moving part of the pump for closing the valve to shut off the pressure of the force main from the force valves, as the plunger reaches the end of the stroke, substantially as described.

9. The combination with the plunger and force valves of a pump, of auxiliary valves located between the plunger and force main and controlling communication between both ends of the plunger and the main and connections substantially as described between said auxiliary valves and a moving part of the pump, whereby the auxiliary valves are operated to close communication between one end of the plunger and the force main and to open communication at the other end, as the plunger reaches the end of its stroke, substantially as described.

10. In a duplex direct-acting pumping-engine, the combination with the plungers and force valves, of an auxiliary valve located on the force side of each plunger, and connections substantially as described between said auxiliary valves and moving parts of the pumping engine for closing said valves to shut off the pressure of the force main from in front of the plungers as they reach the end of their strokes, substantially as described.

11. In a duplex direct-acting pumping-engine, the combination with the plungers, of a valve located upon the force side of each plunger, and means substantially as described for positively closing said valves to shut off the pressure of the force main from in front of the plungers as they reach the end of their strokes, substantially as described.

12. In a duplex-pumping engine, the combination with the motors on opposite sides and their steam and water valves, of connections substantially as described whereby the steam valves are operated mechanically at the beginning of the stroke by the motor on the other side, and the water valves are closed mechanically at the end of the stroke by the motor on their own side, substantially as described.

13. The combination with the cushioned motor piston and plunger of a direct acting steam pumping engine, of a valve located upon the force side of the plunger, and means substantially as described for positively closing the valve to remove the pressure of the force main from in front of the plunger as it reaches the end of its stroke, substantially as described.

14. The combination with the cushioned motor pistons and plungers of a duplex direct acting steam pumping engine, of a valve located on the force side of each plunger, and means substantially as described for positively closing said valves to remove the pressure of the force main from in front of the plungers as they reach the end of their strokes, substantially as described.

15. In a duplex pump the combination with the piston rods, and valve movements actuated thereby for operating the steam valves from opposite sides of the pump, of devices for positively closing the water valves, and connections between said devices and the valve movements whereby the valve movement on each side of the pump operates the steam valves on the opposite side and the water valves on its own side, substantially as described.

16. The combination with the valves $d$ of rods 10 having heads engaging the valves, oscillating lever 13 carrying said rods, shaft 2 actuated by a moving part of the pump, and connecting rod 14 between said shaft and lever, substantially as described.

17. The combination with valves $d$, of rods 10 having heads engaging said valves, oscillating lever 13 and yielding connections between said rods and lever, rock shaft 2 actuated by a moving part of the pump, and connecting rod 14 between said shaft and lever, substantially as described.

18. The combination with the valves $d$, of rods 10 having heads engaging said valves, oscillating lever 13, bell crank levers 16 fulcrumed on said oscillating lever and connected to the rods 10, spring 17 connecting said bell crank levers, rock shaft 2 actuated by a moving part of the pump, and connecting rod 14 between said shaft and lever 13, substantially as described.

19. The combination with the valves $d$, of rods 10 having heads engaging said valves, oscillating lever 13, bell crank levers 16 fulcrumed on said oscillating lever and connected to the rods 10, spring 17 and stops 30, rock shaft 2 actuated by a moving part of the pump, and connecting rod 14 between said shaft and lever 13, substantially as described.

20. The combination with the piston rods C, rock shafts 2, levers 3 and connecting rods 4 for operating the steam valves of a duplex pump from opposite sides, of devices for closing the water valves and connecting rods 14 connecting said devices with the rock shafts 2 actuated from their own side of the pump, substantially as described.

21. The combination with the piston rods C, rock shafts 2, levers 3 and connecting rods 4 for operating the steam valves of a duplex pump from opposite sides, of water valves $d$, rods 10 having heads engaging said valves, oscillating levers 13 carrying said rods, and connecting rods 14 between said levers and the rock shafts 2 actuated from their own side of the pump, substantially as described.

22. The combination with the piston rods C, rock shafts 2, levers 3 and connecting rods 4 for operating the steam valves of a duplex pump from opposite sides, of water valves $d$, rods 10 having heads engaging the valves, oscillating levers 13, bell crank levers 16 fulcrumed on said oscillating levers and connected to said rods 10, and spring 17 substantially as described.

In testimony whereof I have hereunto set my hand in the presence of two subscribing witnesses.

CHAS. C. WORTHINGTON.

Witnesses:
B. W. PIERSON,
LOUIS R. ALBERGER.